United States Patent [19]

Vicq

[11] Patent Number: 4,999,979
[45] Date of Patent: Mar. 19, 1991

[54] MACHINE FOR CONTINUOUSLY PACKING IN PARTICULAR FOOD OR PHARMACEUTICAL PRODUCTS IN PLASTIC MATERIAL CONTAINERS

[75] Inventor: Jean-Marie Vicq, Paris, France

[73] Assignee: A.R.C.I.L., Chatou, France

[21] Appl. No.: 378,659

[22] Filed: Jul. 12, 1989

[30] Foreign Application Priority Data

Jul. 13, 1988 [FR] France ............................. 88 09533

[51] Int. Cl.$^5$ ...................... B65B 47/02; B65G 23/14; F16H 27/02; F16H 31/00
[52] U.S. Cl. ......................................... 53/559; 53/201; 74/126; 74/142; 198/833; 198/358; 474/153
[58] Field of Search ........................ 53/453, 559, 201; 74/126, 142; 198/833, 859; 474/153, 167

[56] References Cited

U.S. PATENT DOCUMENTS

| | | | |
|---|---|---|---|
| 3,524,298 | 8/1970 | Hamilton | 53/559 X |
| 3,593,492 | 7/1971 | Frankefort | 53/559 |
| 3,874,143 | 4/1975 | Braber | 53/453 X |
| 4,054,202 | 10/1977 | Hautemont | 198/859 X |
| 4,064,676 | 12/1977 | King et al. | 53/559 X |
| 4,209,957 | 7/1980 | Utzmann | 53/453 |
| 4,662,149 | 5/1987 | Hamilton | 53/453 |
| 4,819,406 | 4/1989 | Redmond | 53/559 X |

Primary Examiner—Robert L. Spruill
Assistant Examiner—Beth Bianca
Attorney, Agent, or Firm—Bell, Seltzer, Park & Gibson

[57] ABSTRACT

A machine is provided for continuously packing food or pharmaceutical products in thermoformed plastic material containers, comprising a station for receiving and unwinding reels of plastic material film, heating stations, a thermoforming station, a dosing station, a sealing station and a cutting station, and chains for moving the plastic material film step by step from one end of the machine to the other, which are driven without slipping over drive wheels having a smooth surface.

6 Claims, 5 Drawing Sheets

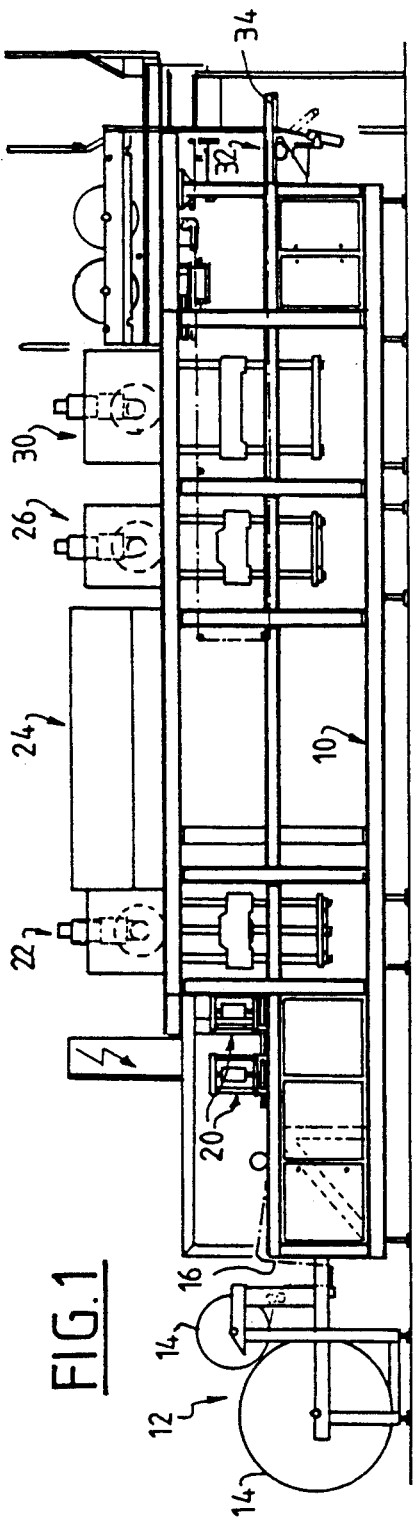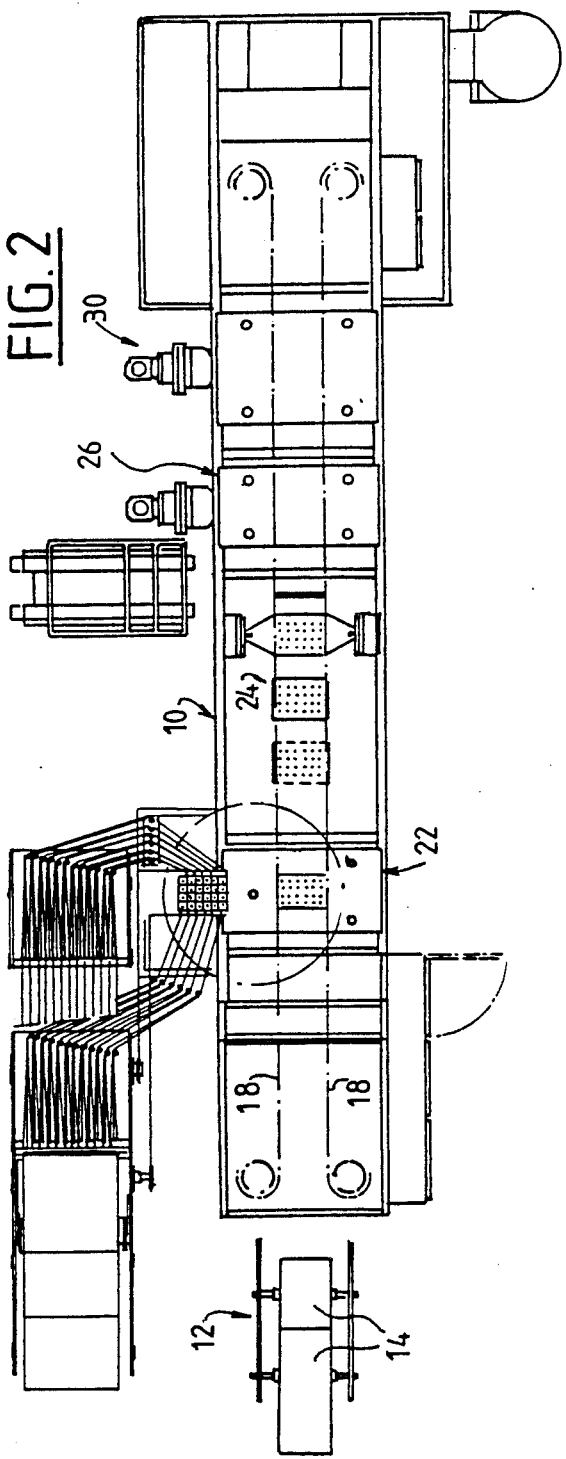

MACHINE FOR CONTINUOUSLY PACKING IN PARTICULAR FOOD OR PHARMACEUTICAL PRODUCTS IN PLASTIC MATERIAL CONTAINERS

BACKGROUND OF THE INVENTION

The invention relates to a machine for continuously packing, in particular, food or pharmaceutical products in plastic material containers which are sealed after filling.

Machines of this type are already known, in which the containers are produced by thermoforming a plastic material film, receive one or more doses of products, are sealed by welding or bonding to their upper face a film of material such as aluminium, a metal coated paper, or a plastic material, then go to a cutting station to be separated from each other or in groups of four, six, eight or twelve for example.

The essential drawback of these known machines is their lack of adaptability to a change of format of the containers. It should be understood that, when the plastic material film in which the containers are thermoformed, is moved from one end to the other of the machine, the tools and/or accessories of the different thermoforming, dosage, sealing and cutting stations must be controlled in perfect synchronism with respect to the movements of the plastic material film and must be positioned exactly with respect to the containers formed from the film. For this reason, the known machines are generally equipped with a longitudinal transmission shaft, the different stations are positioned very precisely and mounted permanently on the frame of the machine, and the synchronization of the tools with the travelling speed of the plastic material film is provided initially in the factory, at the time of construction of the machine. The result is that, when it is necessary to modify the machine because for example of a change of format of the containers or groups of containers, it is not sufficient to change some tools or accessories such as the thermoforming molds, the number and position of the product dosing nozzles, the number and position of the means for welding the covers and the cutting blades, it is further necessary to reposition the different stations and resynchronize the whole of the machine, which corresponds in fact to substantially complete reconstruction of the machine. That can only be done in the factory, by specialized staff, and these modification operations are extremely time-consuming and expensive.

The object of the invention is essentially to provide a machine of the above type but which is "flexible" and adaptable simply and rapidly, on the spot, to modifications such as change of format of the containers or groups of containers etc . . .

The invention also provides a machine of the above type which is more reliable and more accurate than those of the prior art.

SUMMARY OF THE INVENTION

The invention provides then a machine for continuously packing, in particular, food or pharmaceutical products in plastic material containers, comprising a frame equipped with means for taking up and displacing a plastic material film from one end to the other of the machine and comprising a station for thermoforming the containers, a station for introducing predetermined amounts of products into the containers, a station for sealing the containers and a cutting station, wherein said plastic material takeup and displacement means comprise two parallel endless chains having teeth or barbs penetrating into the edges of the film, slides for guiding these chains and means for driving the chains step by step without slipping on passing over drive wheels driven by a pilot motor.

Thus, very precise movement of the film is obtained from one station to another, which is essential for the correct running of the operations, and perfect synchronization of the movement of the two chains.

In a preferred embodiment of the invention, the drive wheels have a smooth groove receiving the chains and the drive means comprise, for each drive wheel, at least one pinion free wheel, disposed at the periphery of the drive wheel and connected thereto by a rotating radial arm and a clutch for engaging the chain on the drive wheel by means of the pinion and moving it in synchronism with the drive wheel over a predetermined angular distance, return means being provided for returning the free wheel to an initial position after each chain movement over one advancing step.

The movement of the chains is thus made independent of the manufacturing tolerances of the links of the chains and of the teeth of the pinions which mesh with the chains.

According to another characteristic of the invention, the above stations are mounted for movement in longitudinal translation along the frame and means are provided for rapidly adapting the machine to a change of format of the containers or of the groups of containers, these means further comprising means for moving the different stations with respect to each other, means for adjusting the movement of the plastic material take-up and displacement means, and means for automatically synchronizing the tools equipping the stations as a function of the movement of the plastic material take-up and displacement means.

Since the different stations are mounted for movement in longitudinal translation along the frame of the machine of the invention, it is simple and rapid to position them with respect to each other as a function of a new format of the containers or groups of containers. It is then sufficient to adjust the control of the plastic material take-up and displacement means to automatically obtain synchronism of the tools and accessories provided at the different stations of the machine.

According to another characteristic of the invention, the stations of the machine comprise independent motors associated with coding wheels and counting and processing means are provided for reading the output signals of the coding wheels and determining the controls of the motors of the different stations as a function of the output signal of a coding wheel associated with the above mentioned pilot motor.

Thus, perfect synchronization is obtained of the movement of the tools in the different stations and of the movement of the plastic material film take-up and displacement means.

According to another characteristic of the invention, the machine also comprises means for adjusting the transverse positioning of the plastic material take-up and displacement means for adapting it to a modification of the width of this film.

Thus, it is possible to change from one film width to another, by simply adjusting the transverse position of the plastic material take-up and displacement means.

BRIEF DESCRIPTION OF THE DRAWINGS

The invention will be better understood and other details, characteristics and advantages thereof will be clearer from reading the following description, given by way of example, with reference to the accompanying drawings in which:

FIG. 1 is a schematic elevational view of a machine in accordance with the invention, FIG. 2 is a top view of this machine.

DESCRIPTION OF THE PREFERRED EMBODIMENTS

FIGS. 1 and 2 are general top views of a machine of the invention.

This machine comprises, over the whole of its length, a frame 10 at one end of which is situated a station 12 for supporting and unwinding reels 14 of a plastic material from which the containers will be thermoformed. The transfer of a reel 14 from its waiting position to its unwinding position may be motorized, as well as rotation of reel 14 about its axis in its unwinding position.

Figure 3:
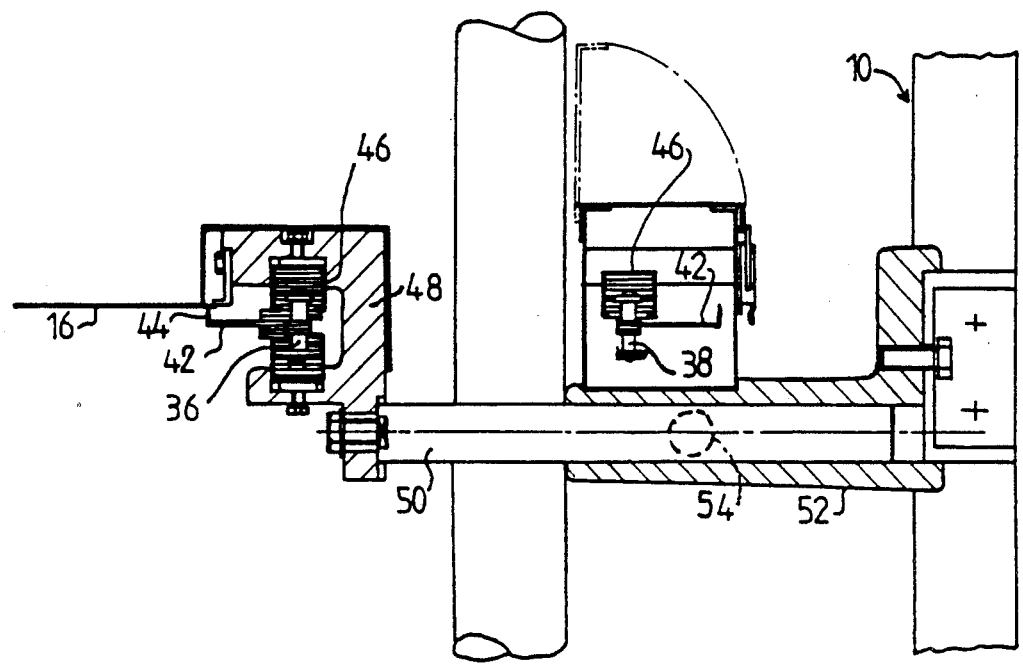
FIG. 3 is a schematic view in vertical cross section of a means for supporting and guiding a plastic material film displacement chain.
Figure 4:
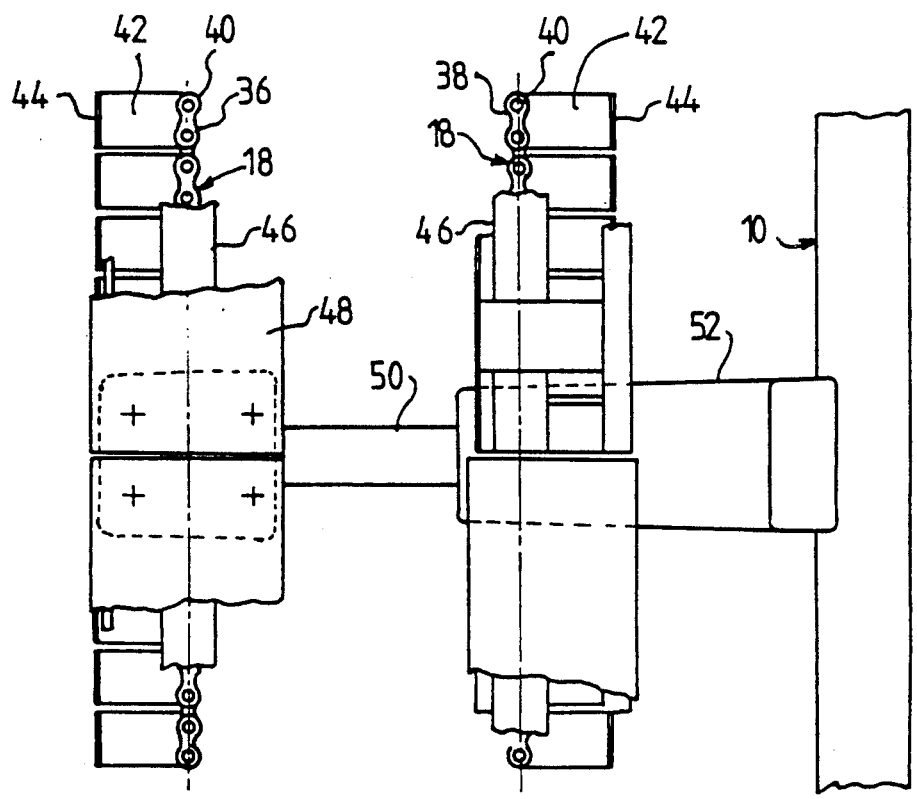
FIG. 4 is a top view of this means.

The plastic material film 16 unwound from a reel 14 forms a reserve loop at the entrance to frame 10, then is seized and moved towards the other end of the frame by parallel endless chains 18, shown in greater detail in FIGS. 3 and 4, and passes successively through heating stations, a decoration positioning and thermoforming station 22, a station 24 delivering predetermined amounts of products and filling the containers, a station 26 for sealing the containers and a station 30 for cutting the containers or groups of containers. A belt conveyor 32 is provided at the exit from the machine for removing the containers or groups of containers and comprises a pivoting portion 34 for discharging poorly filled or unfilled containers, controlled by detection means provided at the product dosing station. The different stations 20, 22, 24, 26, 30 of the machine are mounted for movement in longitudinal translation along frame 10 so as to permit ready adaptation of changes of format of the containers or groups of containers.

In FIGS. 3 and 4 have been shown the means for supporting and guiding the plastic material film 16 take up and displacement chains 18.

Chains 18 are endless chains forming a loop in a horizontal plane, comprising one side 36 for advancing the plastic material film and a return side 38. Each chain is formed of horizontal links 40 with vertical axes on which are mounted horizontal median plates 42, a raised outer edge 44 of which comprises teeth or points for penetrating into a longitudinal edge of the plastic material film 16. To prevent such penetration of the teeth of chains 18 into the plastic material film from tearing small pieces of plastic, which might be a cause of pollution of the products with which the containers are filled, the edges of the plastic material film 16 are heated to soften them, before being taking up by the teeth of chains 18.

The links 40 of the chains are received in longitudinal slides 46, comprising plastic material linings with a very low friction coefficient, and these slides are themselves carried by pieces 38 mounted at the end of transverse horizontal rods 50 guided in sleeves 52 fixed on frame 10, and immobilized in position in these slides by means of locking screws 54.

It will be readily understood that, if it is desired to adjust the distance between the sides 36 of the two chains 18 to adapt to a new plastic material film width, it is sufficient to untighten screws 54, to slide rods 50 in sleeves 52 and to retighten screws 54. Automatic and greasing stations for the chains may be provided in the paths of the return sides 38.

Figure 5:
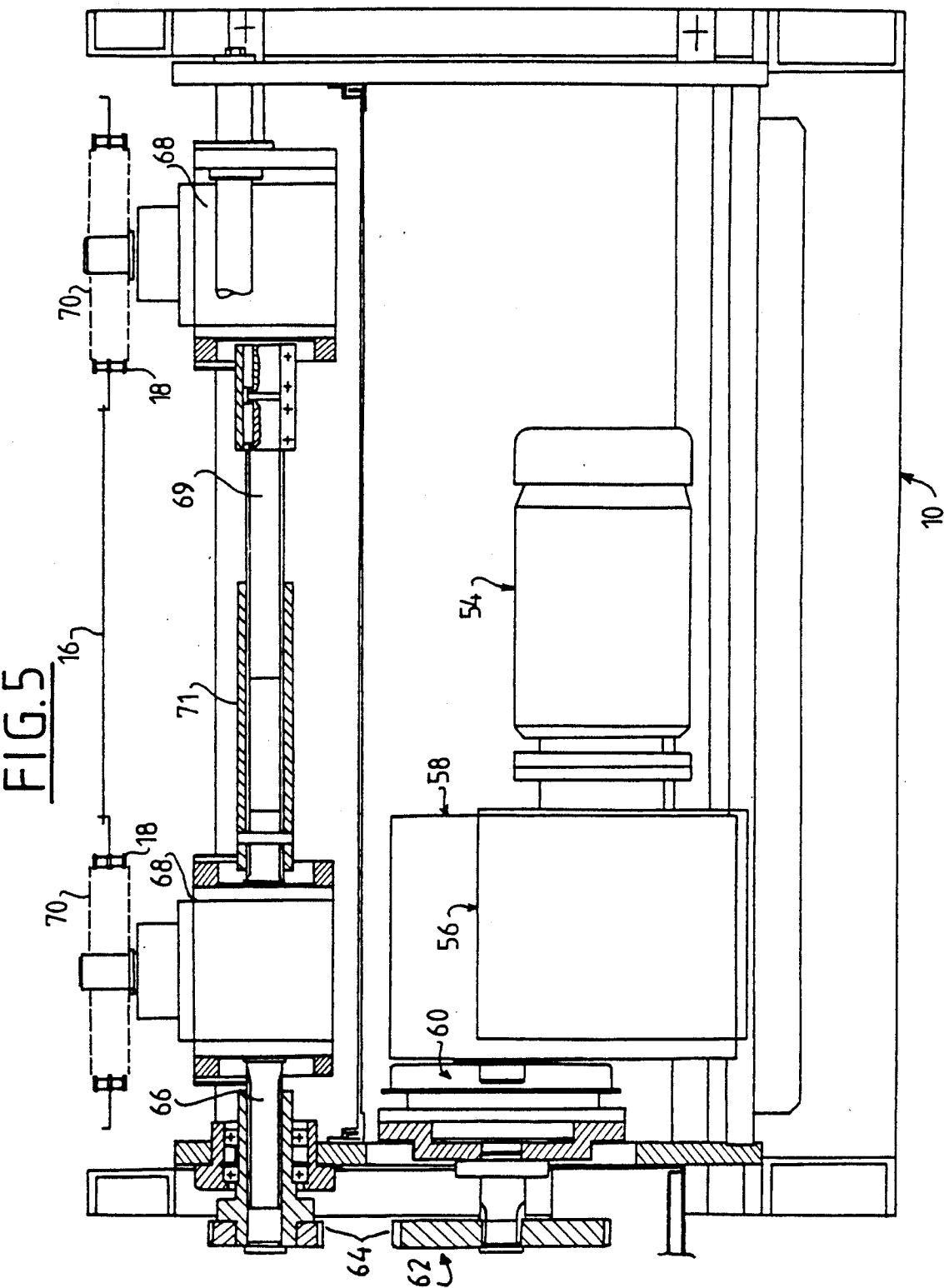
FIG. 5 is a schematic view in vertical cross section of a portion of the chain drive means.
Figure 6:
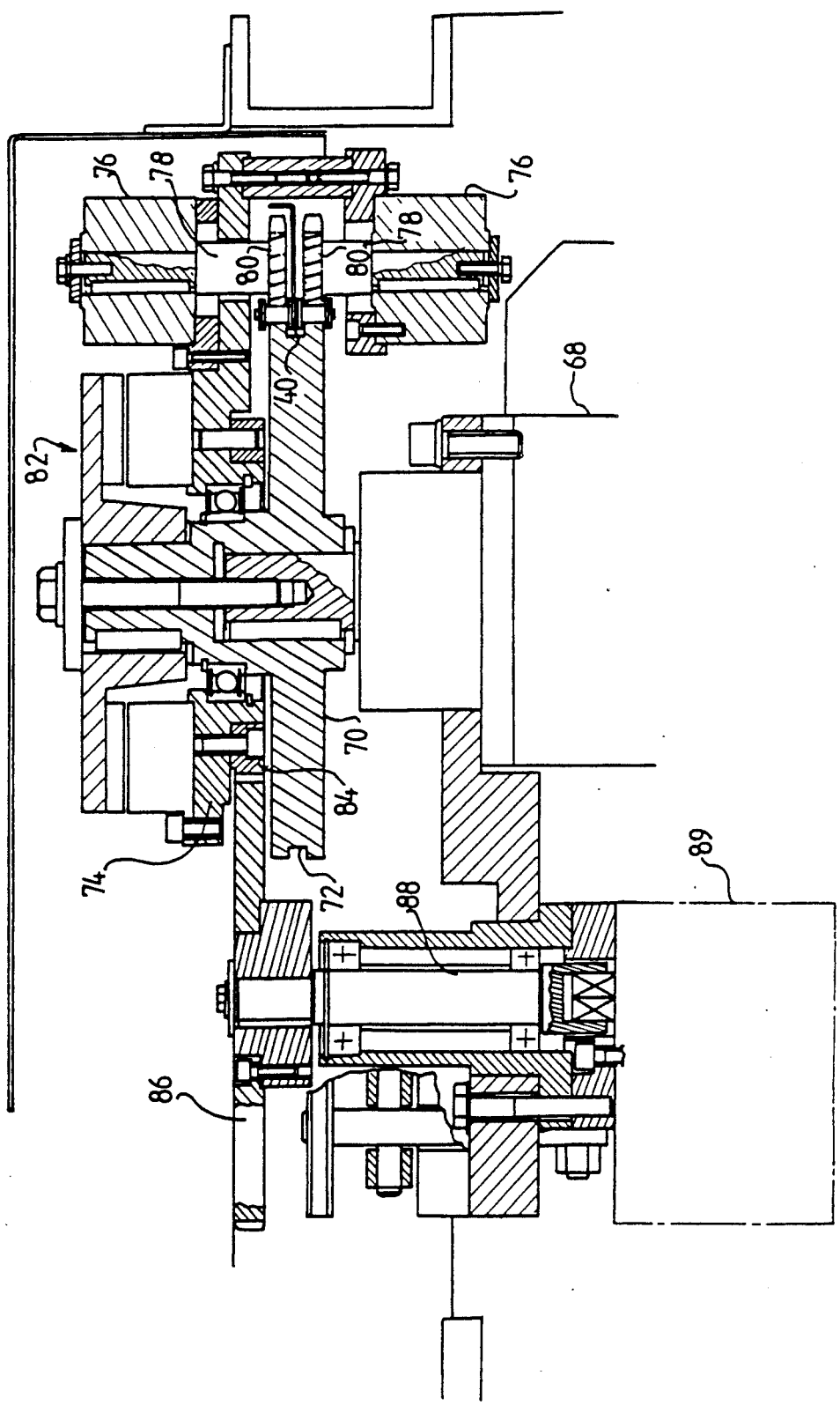
FIG. 6 is a schematic view in vertical cross section of a chain drive wheel.
Figure 7:
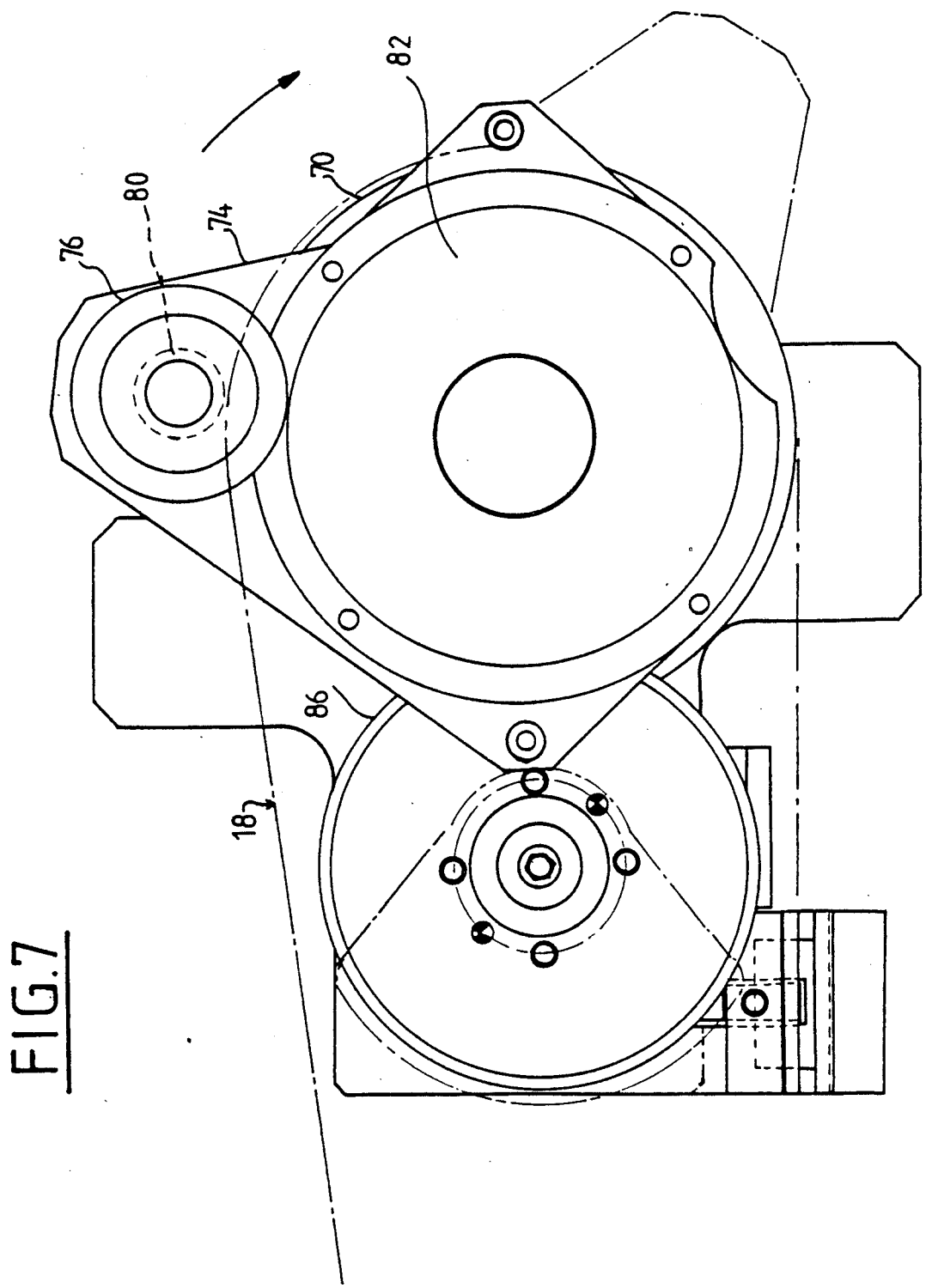
FIG. 7 is a top view of the system shown in FIG. 6.

With reference to FIGS. 5, 6, and 7, the means for driving the chains 18 taking up and moving the plastic material film will now be described.

These means comprise (FIG. 5) an electric motor 54 carried by the frame 10 and whose output is connected by a reducer 56, an indexer 58 and a torque limiter 60 to a gear train 62 whose two toothed wheels 64 are shown in FIG. 5, one of these toothed wheels being mounted at the output of the torque limiter 60, the other being mounted at the end of a transverse horizontal drive shaft 66 with two change of direction boxes 68 on the output shafts of which are mounted the two drive wheels 70 with vertical axis for driving chains 18.

The two toothed wheels 64 of the gear train 62 mesh with an intermediate toothed wheel, not shown. The change of direction boxes 68 are connected together by a transmission of adjustable length, comprising a splined shaft section 69, guided in translation in a horizontal transverse sleeve 71 splined on the inside, which makes it possible to draw the two drive wheels 70 closer together or move them away from each other as a function of the width of the plastic material film 16.

To provide precise and synchronous drive of the two chains 18, the drive wheels 70 are not toothed wheels, but have a smooth peripheral surface comprising an annular groove 72 receiving the median part of the links 40 of chains 18 (FIG. 6). Each drive wheel 70 is associated with a radial arm 74 mounted for rotation about the axis of wheel 70 and carrying two free wheel mechanisms 76, aligned and placed on each side of the drive wheel 70, and each comprising a vertical shaft 78 on which is mounted a pinion 80 meshing with the lines 40 of chain 18 applied on the periphery of wheel 70.

An electromagnetic clutch 82 makes it possible to engage and disengage at will the wheel 70 and the radial arm 74.

In addition, the radial arm 74 is fast with a pinion 84 coaxial with the drive wheel 70, which meshes with a pinion 86 mounted on the output shaft 88 of a rotary jack 89, forming the means for returning the radial arm 74 and its free wheel 76 into an initial angular position with respect to the axis of drive wheel 70.

This drive system operates in the following way.

The continuous rotational movement obtained at the output of the motor 54-reducer 56 assembly is transformed into a step by step rotational movement by indexer 58, in a conventional way. The transmission ratio between the output of indexer 58 and the drive shaft 66 of the drive wheels 70 through change of direction boxes 68 is determined by the gear train 62, whose toothed wheels are removable and readily accessible, for any modification of this transmission ratio.

The step by step rotational movement of wheels 70 is transmitted to chains 18 in the following way: each time that a drive wheel 70 stops, the electromagnetic clutch 82 is de-energized, for disengaging the radial arm 74 and wheel 70, and the pneumatic jack 89 is fed with compressed air, for rotating the radial arm 74 about the axis of wheel 70 through pinions 86 and 84, and bringing the radial arm and its free wheel 76 back into an initial angular position shown with a continuous line in FIG. 7. During this return movement, the free wheels 76 allow the pinions 80 meshing with the links of chain 18 to rotate freely, so that such rotation of the radial arm 74 has no effect on chain 18 which remains immobilized.

When the drive wheel 70 begins to rotate again, the pneumatic jack 89 is vented, the electromagnetic clutch 82 is energized and the radial arm 74 is locked with wheel 70 to be driven in rotation in the direction shown by the arrows in FIG. 7. During such rotation, the free wheel mechanisms 76 prevent any rotation of pinions 80 meshing with the links of chain 18, so that the latter is immobilized with respect to the periphery of the drive wheel 70 and is therefore driven by this drive wheel.

When wheel 70 has rotated through a predetermined angular distance, clutch 82 is de-energized, jack 89 is fed with power and arm 74 is brought back into its initial angular position shown with continuous lines.

This method of driving the toothed wheels is extremely precise, for it does not depend on the penetration of the teeth of a wheel into the links of a chain and so on the manufacturing tolerances of the toothed wheel and of the links of the chain. The free wheel mechanisms 76 and their pinions 80 prevent any relative movement of the chain with respect to the periphery of the drive wheel 70 during rotation thereof.

If so desired, to prevent any slipping of the chain on the drive wheel 70 when the latter is stopped, an additional free wheel and pinion mechanism can be provided meshing with the chain over a portion of the periphery of wheel 70, the free wheel allowing free rotation of the associated pinion during rotation of the drive wheel 70, and preventing any rotation of the associated pinion in the opposite direction.

The output shaft of the indexer 58 is equipped with a coding wheel system, for detecting its rotation with a very high precision and delivering for example 4000 pulses per revolution. The rotation of the output shaft of indexer 58 is used as a basic signal for synchronizing the motors equipping the different stations of the machine. The output shafts of these motors or the associated indexers are also equipped with coding wheels, having the same precision as that of indexer 58. A processing system is connected by counters to the different coding wheels and produces signals for controlling or adjusting the motors of the stations of the machine, for synchronizing them with the drive means of the chains 18.

I claim:

1. A machine for continuously packing food or pharmaceutical products in plastic material containers, comprising a frame equipped with means for taking up and displacing a plastic material film from one end to the other of the machine, a station for thermoforming the containers, a station for introducing predetermined amounts of products into the containers, a station for sealing the containers and a cutting station, wherein said plastic material film takeup and displacement means comprise two parallel endless chains having teeth or barbs penetrating into the edges of the film, slides for guiding these chains and means for driving the chains step by step without slipping, said means for driving the chains including drive wheels having a smooth groove receiving the chains, a pinion free wheel for each drive wheel disposed at the periphery of the drive wheel and connected thereto by a rotating radial arm and a clutch for engaging the chain on the drive wheel by means of said pinion wheel and moving it in synchronism with the drive wheel over a predetermined angular distance, and return means for returning the pinion wheel to an initial position after each chain movement over one advancing step.

2. The machine as claimed in claim 7, wherein said rotating radial arm has two free wheels aligned with each other and disposed on each side of the drive wheel for engaging the same link of the chain by their pinion.

3. The machine as claimed in claim 2, wherein said return means comprise a rotary jack connected by gears to said rotating radial arm.

4. The machine as claimed in one of claims 1, 2 or 3, further comprising means for adjusting the transverse positioning of the plastic material film take up and displacement means, for adapting them to a modification of the width of this film.

5. The machine as claimed in claim 4, wherein said drive wheels are driven in rotation by change of direction boxes connected together by an adjustable length transmission, for adaptation to a modification of the width of the plastic material film.

6. A machine as claimed in claim 1, comprising means for adjusting the distance between said parallel chains and the distance between said drive wheels as a function of the width of the plastic material film.

* * * * *

UNITED STATES PATENT AND TRADEMARK OFFICE
CERTIFICATE OF CORRECTION

PATENT NO. : 4,999,979
DATED : March 19, 1991
INVENTOR(S) : Jean-Marie Vicq

It is certified that error appears in the above-indentified patent and that said Letters Patent is hereby corrected as shown below:

Column 4, line 46, "lines" should be -- links --.

Column 6, line 28, "claim 7" should be -- claim 1 --.

Signed and Sealed this

Twenty-first Day of June, 1994

Attest:

BRUCE LEHMAN

Attesting Officer          Commissioner of Patents and Trademarks